(12) United States Patent
DeWitt, Jr. et al.

(10) Patent No.: US 7,987,453 B2
(45) Date of Patent: Jul. 26, 2011

(54) METHOD AND APPARATUS FOR DETERMINING COMPUTER PROGRAM FLOWS AUTONOMICALLY USING HARDWARE ASSISTED THREAD STACK TRACKING AND CATALOGED SYMBOLIC DATA

(75) Inventors: Jimmie Earl DeWitt, Jr., Georgetown, TX (US); Frank Eliot Levine, Austin, TX (US); Christopher Michael Richardson, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1963 days.

(21) Appl. No.: 10/803,663

(22) Filed: Mar. 18, 2004

(65) Prior Publication Data

US 2005/0210454 A1 Sep. 22, 2005

(51) Int. Cl.
*G06F 9/44* (2006.01)
*G06F 9/00* (2006.01)

(52) U.S. Cl. .......... 717/133; 717/128; 714/30; 712/227

(58) Field of Classification Search .............. None
See application file for complete search history.

(56) References Cited

U.S. PATENT DOCUMENTS

| | | | |
|---|---|---|---|
| 4,291,371 A | 9/1981 | Holtey | 364/200 |
| 5,103,394 A | 4/1992 | Blasciak | 395/575 |
| 5,555,432 A | 9/1996 | Hinton et al. | |
| 5,590,352 A | 12/1996 | Zuraski et al. | |
| 5,652,858 A | 7/1997 | Okada et al. | |
| 5,691,920 A | 11/1997 | Levine et al. | 364/551.01 |
| 5,761,103 A | 6/1998 | Oakland et al. | |
| 5,774,724 A | 6/1998 | Heisch | 395/704 |
| 5,805,879 A | 9/1998 | Hervin et al. | |
| 5,822,790 A | 10/1998 | Mehrotra | |
| 5,875,294 A | 2/1999 | Roth et al. | |

(Continued)

FOREIGN PATENT DOCUMENTS

JP  2000029731  12/1999

(Continued)

OTHER PUBLICATIONS

"Method for the dynamic prediction of nonsequential memory accesses", Sep. 25, 2002, pp. 1-4, ip.com IPCOM000009888D.

(Continued)

*Primary Examiner* — Michael J Yigdall
*Assistant Examiner* — Ben C Wang
(74) *Attorney, Agent, or Firm* — Yee & Associates, P.C.; David A. Mims, Jr.

(57) ABSTRACT

A method, apparatus, and computer instructions for determining computer flows autonomically using hardware assisted thread stack and cataloged symbolic data. When a new thread is spawned during execution of a computer program, new thread work area is allocated by the operating system in memory for storage of call stack information for the new thread. Hardware registers are set with values corresponding to the new thread work area. Upon context switch, values of the registers are saved in a context save area for future restoration.

When call stack data is post-processed, the operating system or a device driver copies call stack data from the thread work areas to a consolidated buffer and each thread is mapped to a process. Symbolic data may be obtained based on the process identifier and address of the method/routine that was called/returned in the thread. Corresponding program flow is determined using retrieved symbolic data and call stack data.

18 Claims, 8 Drawing Sheets

U.S. PATENT DOCUMENTS

| | | | |
|---|---|---|---|
| 5,913,925 A | 6/1999 | Kahle et al. | |
| 5,930,508 A | 7/1999 | Faraboschi et al. | 395/706 |
| 5,937,437 A | 8/1999 | Roth et al. | 711/202 |
| 5,938,778 A | 8/1999 | John, Jr. et al. | 714/45 |
| 5,966,537 A | 10/1999 | Ravichandran | 395/709 |
| 5,987,250 A | 11/1999 | Subrahmanyam | 395/704 |
| 6,070,009 A | 5/2000 | Dean et al. | 395/704 |
| 6,073,109 A | 6/2000 | Flores et al. | |
| 6,098,169 A | 8/2000 | Ranganathan | |
| 6,101,524 A | 8/2000 | Choi et al. | 709/102 |
| 6,105,051 A * | 8/2000 | Borkenhagen et al. | 718/103 |
| 6,105,129 A | 8/2000 | Meier et al. | |
| 6,134,676 A | 10/2000 | VanHuben et al. | 714/39 |
| 6,145,077 A | 11/2000 | Sidwell et al. | |
| 6,149,318 A | 11/2000 | Chase et al. | |
| 6,185,671 B1 | 2/2001 | Pentovski et al. | |
| 6,189,141 B1 | 2/2001 | Benitez et al. | 717/4 |
| 6,192,513 B1 | 2/2001 | Subrahmanyam | 717/5 |
| 6,199,204 B1 | 3/2001 | Donohue | |
| 6,202,207 B1 | 3/2001 | Donohue | |
| 6,206,584 B1 | 3/2001 | Hastings | 395/183.11 |
| 6,223,338 B1 | 4/2001 | Smolders | 717/4 |
| 6,243,804 B1 | 6/2001 | Cheng | 712/228 |
| 6,247,113 B1 | 6/2001 | Jaggar | |
| 6,256,775 B1 * | 7/2001 | Flynn | 717/127 |
| 6,286,132 B1 | 9/2001 | Tanaka et al. | 717/4 |
| 6,324,689 B1 | 11/2001 | Lowney et al. | 717/9 |
| 6,330,662 B1 | 12/2001 | Patel et al. | 712/236 |
| 6,351,844 B1 | 2/2002 | Bala | 717/4 |
| 6,374,364 B1 | 4/2002 | McElroy et al. | 714/10 |
| 6,381,679 B1 | 4/2002 | Matsubara et al. | |
| 6,430,741 B1 | 8/2002 | Mattson, Jr. et al. | 717/154 |
| 6,442,585 B1 | 8/2002 | Dean et al. | 709/108 |
| 6,446,029 B1 | 9/2002 | Davidson et al. | 702/186 |
| 6,460,135 B1 | 10/2002 | Suganuma | |
| 6,480,938 B2 | 11/2002 | Vondran, Jr. | 711/125 |
| 6,539,458 B2 | 3/2003 | Holmberg | |
| 6,549,930 B1 | 4/2003 | Chrysos et al. | |
| 6,598,153 B1 | 7/2003 | Flachs et al. | |
| 6,647,301 B1 | 11/2003 | Sederlund et al. | |
| 6,654,781 B1 * | 11/2003 | Browning | 718/104 |
| 6,658,416 B1 * | 12/2003 | Hussain et al. | 707/10 |
| 6,687,794 B2 | 2/2004 | Malik | |
| 6,721,875 B1 | 4/2004 | McCormick et al. | |
| 6,735,666 B1 | 5/2004 | Koning | |
| 6,782,454 B1 | 8/2004 | Damron | |
| 6,842,850 B2 | 1/2005 | Ganapathy et al. | |
| 6,848,029 B2 | 1/2005 | Coldewey | |
| 6,865,666 B2 | 3/2005 | Yoshida et al. | |
| 6,871,298 B1 | 3/2005 | Cavanaugh et al. | |
| 6,928,521 B1 | 8/2005 | Burton et al. | |
| 6,944,720 B2 | 9/2005 | Sperber et al. | |
| 6,973,417 B1 | 12/2005 | Maxwell et al. | |
| 6,973,542 B1 | 12/2005 | Schmuck et al. | |
| 6,988,186 B2 * | 1/2006 | Eickemeyer et al. | 712/217 |
| 7,024,668 B2 | 4/2006 | Shiomi et al. | |
| 7,035,996 B2 | 4/2006 | Woodall et al. | |
| 7,207,043 B2 | 4/2007 | Blythe et al. | |
| 7,237,242 B2 | 6/2007 | Blythe et al. | |
| 2001/0032305 A1 | 10/2001 | Barry | 712/34 |
| 2002/0010733 A1 * | 1/2002 | Baba et al. | 709/108 |
| 2002/0019976 A1 | 2/2002 | Patel et al. | 717/137 |
| 2002/0124237 A1 | 9/2002 | Sprunt et al. | 717/127 |
| 2002/0129309 A1 | 9/2002 | Floyd et al. | 714/724 |
| 2002/0147965 A1 | 10/2002 | Swaine et al. | 717/124 |
| 2002/0199179 A1 | 12/2002 | Lavery et al. | 717/158 |
| 2003/0041096 A1 | 2/2003 | Johnson | |
| 2003/0126590 A1 | 7/2003 | Burrows et al. | |
| 2004/0153612 A1 | 8/2004 | Mutz et al. | |
| 2004/0216104 A1 * | 10/2004 | Fluhr et al. | 718/100 |
| 2004/0216105 A1 * | 10/2004 | Burky et al. | 718/100 |
| 2005/0091456 A1 | 4/2005 | Huck | |
| 2005/0102673 A1 * | 5/2005 | DeWitt et al. | 718/100 |
| 2005/0108483 A1 | 5/2005 | Bungo | |
| 2005/0177822 A1 | 8/2005 | Kuch et al. | |
| 2005/0257092 A1 | 11/2005 | Alexander et al. | |

FOREIGN PATENT DOCUMENTS

| | | |
|---|---|---|
| JP | 2000347863 | 12/2000 |

OTHER PUBLICATIONS

"Cache Miss Director—A Means of Prefetching Cache Missed Lines", Aug. 1, 1982, IBM Technical Disclosure Bulletin, vol. 25, Issue 3A, pp. 1286.

Tanenbaum, "Structured Computer Organization", Prentice Hall, 1984, pp. 10-12.

Kikuchi, "Parallelization Assist System", Joho Shori, vol. 34, No. 9, Sep. 1993, pp. 1158-1169.

Cohen et al., "Hardware-Assisted Characterization of NAS Benchmarks", Cluster Computing, vol. 4, No. 3, Jul. 2001, pp. 189-196.

Talla et al., "Evaluating Signal Processing and Multimedia Applications on SIMD, VLIW and Super Scalar Architectures", International Conference on Computer Design, Austin, Sep. 17-20, 2000, pp. 163-172.

Iwasawa et al., "Parallelization Method of Fortran DO Loops by Parallelizing Assist System", Transactions of Information Processings Society of Japan, vol. 36, No. 8, Aug. 1995, pp. 1995-2006.

Talla et al., "Execution Characteristics of Multimedia Applications on a Pentium II Processor", IEEE International Performance, Computing, and Communications Conference, 19$^{th}$, Phoenix, Feb. 20-22, 2000, pp. 516-524.

IBM Research Disclosure Bulletin 444188, "Enable Debuggers as an Objective Performance Measurement Tool for Software Development Cost Reduction", Apr. 2001, pp. 686-688.

U.S. Appl. No. 09/435,069 AT9-99-491, filed Nov. 4, 1999, Davidson et al., Method and Apparatus for Instruction Sampling for Performance Monitoring and Debug.

U.S. Appl. No. 08/538,071, filed Oct. 2, 1995, Gover et al., Method and System for Selecting and Distinguishing an Event Sequence using an Effective Address in a Processing System.

U.S. Appl. No. 10/675,777, filed Sep. 30, 2003, DeWitt, Jr. et al., Method and Apparatus for Counting Instruction Execution and Data Accesses.

U.S. Appl. No. 10/674,604, filed Sep. 30, 2003, Levine et al., Method and Apparatus for Selectively Counting Instructions and Data Accesses.

U.S. Appl. No. 10/675,831, filed Sep. 30, 2003, DeWitt, Jr. et al., Method and Apparatus for Generating Interrupts Upon Execution of Marked Instructions and Upon Access to Marked Memory Locations.

U.S. Appl. No. 10/675,778, filed Sep. 30, 2003, DeWitt, Jr. et al., Method and Apparatus for Counting Data Accesses and Instruction Executions that Exceed a Threshold.

U.S. Appl. No. 10/675,776, filed Sep. 30, 2008, DeWitt, Jr. et al., Method and Apparatus for Counting Execution of Specific Instructions and Accesses to Specific Data Locations.

U.S. Appl. No. 10/675,751, filed Sep. 30, 2003, DeWitt, Jr. et al., Method and Apparatus for Debug Support for Individual Instructions and Memory Locations.

U.S. Appl. No. 10/675,721, filed Sep. 30, 2003, Levine et al., Method and Apparatus to Autonomically Select Instructions for Selective Counting.

U.S. Appl. No. 10/674,642, filed Sep. 30, 2003, Levine et al., Method and Apparatus to Autonomically Count Instruction Execution for Applications.

U.S. Appl. No. 10/674,606, filed Sep. 30, 2003, Levine et al., Method and Apparatus to Autonomically Take an Exception on Specified Instructions.

U.S. Appl. No. 10/675,783, filed Sep. 30, 2003, Levine et al., Method and Apparatus to Autonomically Profile Applications.

U.S. Appl. No. 10/675,872, filed Sep. 30, 2003, DeWitt, Jr. et al., Method and Apparatus for Counting Instruction and Memory Location Ranges.

Grunwald et al., "Whole Program Optimization for Time and Space Efficient Threads", pp. 50-59, Proceedings of the 7th International Conference on Architectural Support for Programming Languages and Operating Systems, Cambridge Massachusetts, 1996.

* cited by examiner

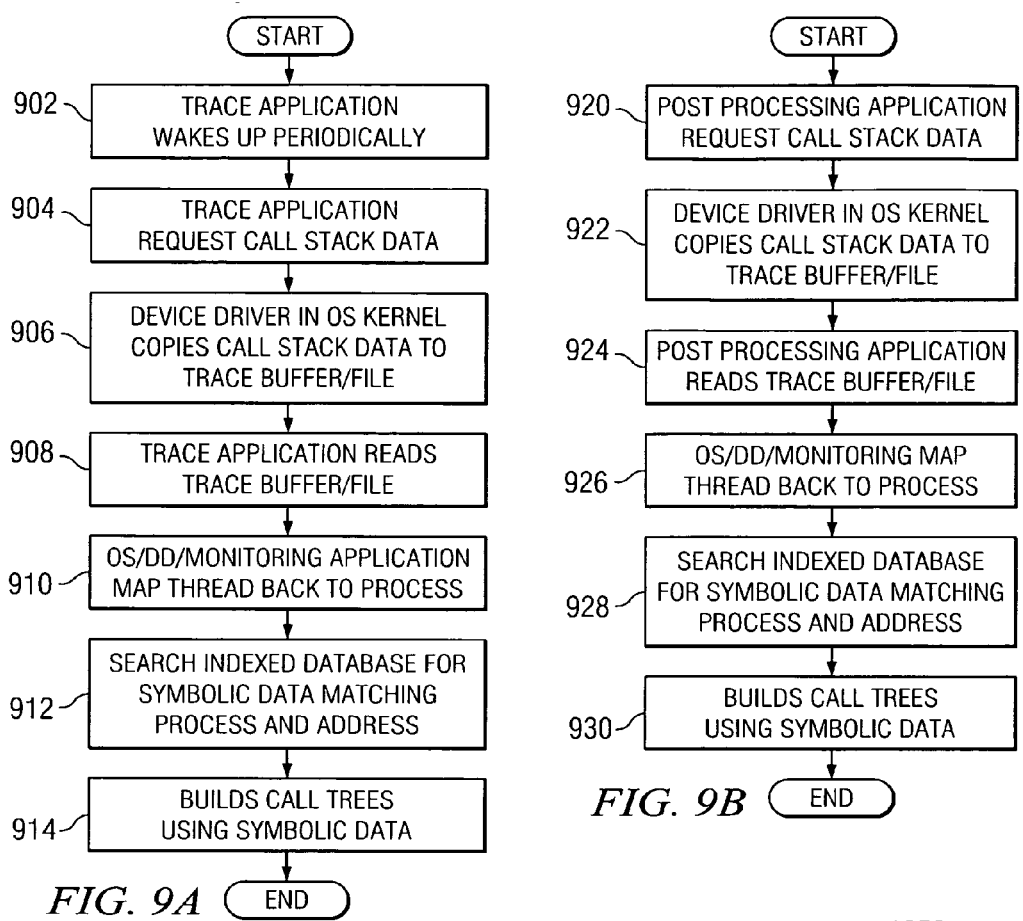
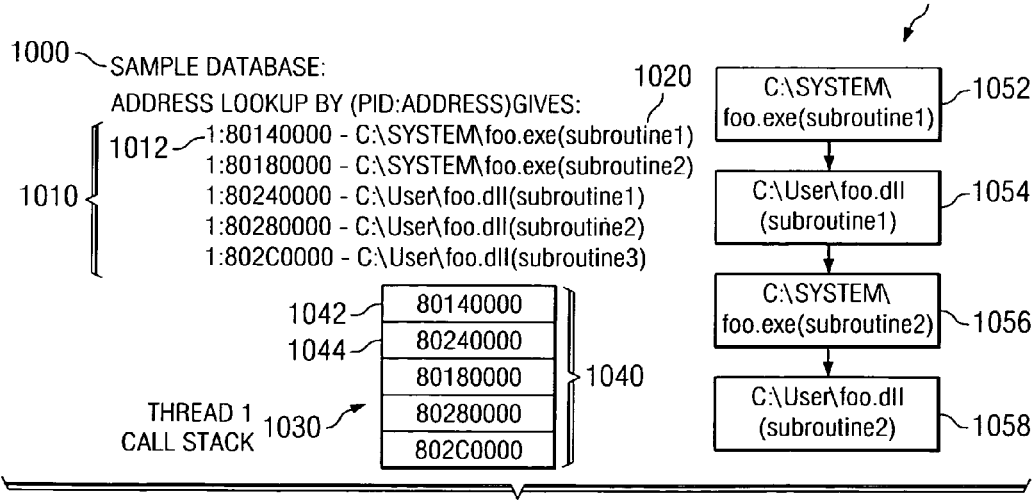

METHOD AND APPARATUS FOR DETERMINING COMPUTER PROGRAM FLOWS AUTONOMICALLY USING HARDWARE ASSISTED THREAD STACK TRACKING AND CATALOGED SYMBOLIC DATA

CROSS REFERENCE TO RELATED APPLICATIONS

The present invention is related to the following applications entitled "APPARATUS AND METHOD FOR AUTONOMIC HARDWARE ASSISTED THREAD STACK TRACKING", Ser. No. 10/703,658, filed on Nov. 6, 2003; "APPARATUS AND METHOD FOR CATALOGING SYMBOLIC DATA FOR USE IN PERFORMANCE ANALYSIS OF COMPUTER PROGRAMS", Ser. No. 09/613,190, filed on Jul. 10, 2000. Both related applications are assigned to the same assignee and are incorporated herein by reference.

BACKGROUND OF THE INVENTION

1. Technical Field

The present invention relates generally to an improved data processing system and, in particular, to a method and system for processing performance data in a data processing system. Still more particularly, the present invention relates to a method, apparatus, and computer instructions for determining computer program flows autonomically using hardware assisted thread stack tracking and cataloged symbolic data.

2. Description of Related Art

In analyzing and enhancing performance of a data processing system and the applications executing within the data processing system, it is helpful to know which software modules within a data processing system are using system resources. Effective management and enhancement of data processing systems require knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

One known software performance tool is a trace tool. A trace tool may use more than one technique to provide trace information that indicates execution flows for an executing program. One technique keeps track of particular sequences of instructions by logging certain events as they occur, a so-called event-based profiling technique. For example, a trace tool may log every entry into, and every exit from, a module, subroutine, method, function, or system component. Alternately, a trace tool may log the requester and the amounts of memory allocated for each memory allocation request. Typically, a time-stamped record is produced for each such event. Corresponding pairs of records similar to entry-exit records also are used to trace execution of arbitrary code segments, starting and completing I/O or data transmission, and for many other events of interest.

Another trace technique involves periodically sampling a program's execution flows to identify certain locations in the program in which the program appears to spend large amounts of time. This technique is based on the idea of periodically interrupting the application or data processing system execution at regular intervals, so-called sample-based profiling. At each interruption, information is recorded for a predetermined length of time or for a predetermined number of events of interest. For example, the program counter of the currently executing thread, which is an executable portion of the larger program being profiled, may be recorded during the intervals. These values may be resolved against a load map and symbol table information for the data processing system at post-processing time, and a profile of where the time is being spent may be obtained from this analysis.

Currently, determining execution flows of a computer program is often performed using software, such as trace tools described above. However, software performance trace tools are often less efficient in performance and require a larger memory footprint. A large memory footprint requires longer loading time and reduces operating efficiency of the system.

In addition, current data processing system applications or computer programs are typically built with symbolic data and may even be shipped to client devices with symbolic data still present in the modules. Symbolic data is, for example, alphanumeric representations of application module names, subroutine names, function names, variable names, and the like.

An application is comprised of modules written as source code in a symbolic language, such as FORTRAN or C++, and then converted to a machine code through compilation of the source code. The machine code is the native language of the computer. In order for a program to run, it must be presented to the computer as binary-coded machine instructions that are specific to that CPU model or family.

Machine language tells the computer what to do and where to do it. When a programmer writes: total=total+subtotal, that statement is converted into a machine instruction that tells the computer to add the contents of two areas of memory where TOTAL and SUBTOTAL are stored.

Since the application is executed as machine code, performance trace data of the executed machine code, generated by the trace tools, is provided in terms of the machine code, i.e. process identifiers, addresses, and the like. Thus, it may be difficult for a user of the trace tools to identify the modules, instructions, and such, from the pure machine code representations in the performance trace data. Therefore, the trace data must be correlated with symbolic data to generate trace data that is easily interpreted by a user of the trace tools.

The symbolic data with which the trace data must be correlated may be distributed amongst a plurality of files. For example, the symbolic data may be present in debug files, map files, other versions of the application, and the like. In the known performance tool systems, in order to correlate the symbolic data with the performance trace data, the performance tool must know the locations of one or more of the sources of symbolic data and have a complex method of being able to handle redundancies in the symbolic data.

In addition, such correlation is typically performed during post-processing of the performance trace data. Thus, an additional separate step is required for converting performance trace data into symbolic representations that may be comprehended by a performance analyst.

The conversion of performance trace data into symbolic representations is performed at a time that may be remote to the time that the performance trace is performed. As a result, the symbolic data may not be consistent with the particular version of the computer program executed during the trace. This may be due to the fact that, for example, a newer version of the application was executed during the trace and the symbolic data corresponds to an older version of the application.

This may be especially true for applications whose symbolic data is maintained at a supplier's location with the machine code being distributed to a plurality of clients. In such a case, the supplier may continue to update the symbolic data, i.e. create new versions of the application, but fail to provide the newest version of the application to all of the clients. In this scenario, if a performance trace were to be performed, the symbolic data maintained by the supplier may not be the same version as the machine code on which the performance trace is performed.

Therefore, it would be advantageous to have an improved method, apparatus, and computer instructions for determining computer program flows that requires a smaller memory footprint and provides user readable results using correlated symbolic data.

SUMMARY OF THE INVENTION

The present invention provides a method, apparatus, and computer instructions for determining computer program flows autonomically using hardware assisted thread stack tracking and cataloged symbolic data. When a new or existing thread is dispatched during execution of a computer program, the present invention provides hardware control registers that assist in allocating or identifying a thread work area where call stack entries are stored for the particular thread.

With the present invention, microcode is programmed with instructions for establishing thread work areas and monitoring the execution of instructions to determine how to update the thread tracking information in the thread work area. In one mode of operation, when tracing occurs, call stack data is written to entries of the thread work area continuously. When the call stack is full, call stack data is copied by the operating system to a consolidated buffer. Thus, a full trace of the thread operation is performed.

In another mode of operation, herein referred to as the call stack mode, when a call operation is detected, call stack data is written by microcode of the processor to the entries of the thread work area. However, when a return operation is detected, call stack data is removed from the stack. Entries are pushed onto and popped from the call stack as the thread is executing. In the call stack mode, the trace application wakes up periodically to instruct the operating system or the device driver to copy call stack data from the thread work area to the consolidated buffer. Thus, only a sample trace of the thread operation is performed.

During or after the tracing phase, the trace application or the post-processing application may perform post-processing of the call stack data. The trace application or the post-processing application reads from the consolidated buffer. The operating system, the device driver, or a performance monitoring application then maps each thread to a process to which the thread belongs. When requested by the trace application or post-processing application, symbolic data is obtained from an indexed database matching the mapped process and address of the method/routine that is called or returned for each thread. Using the symbolic data and the call stack data, a call sequence is generated. After generating a call sequence, the trace application or post-processing application autonomically determines the corresponding computer program flow.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2B is an exemplary block diagram of a stand-alone or client data processing system in which aspects of the present invention may be implemented;

FIG. 9A is a flowchart process illustrating an exemplary process of determining computer program flow autonomically using thread stack tracking information and cataloged symbolic data when post-processing is performed during profiling in accordance with a preferred embodiment of the present invention;

FIG. 9B is a flowchart process illustrating an exemplary process of determining computer program flows autonomically using thread stack tracking information and cataloged symbolic data when post-processing is performed after profiling in accordance with a preferred embodiment of the present invention; and FIG. 10 is a diagram illustrating an example indexed symbolic database, example call stack entries, and an example call sequence in accordance with a preferred embodiment of the present invention.

DETAILED DESCRIPTION OF THE PREFERRED EMBODIMENT

The present invention provides a method, apparatus, and computer instructions for determining computer program flows autonomically using hardware assisted thread stack tracking and cataloged symbolic data. The present invention may be implemented in a stand-alone computing device or in a network based computing device. For example, the present invention may be implemented in a personal computer, a network computer, a server, or the like. Thus, the following diagrams in FIGS. 1-2B are intended to provide a context for the operations described hereafter.

Figure 1:
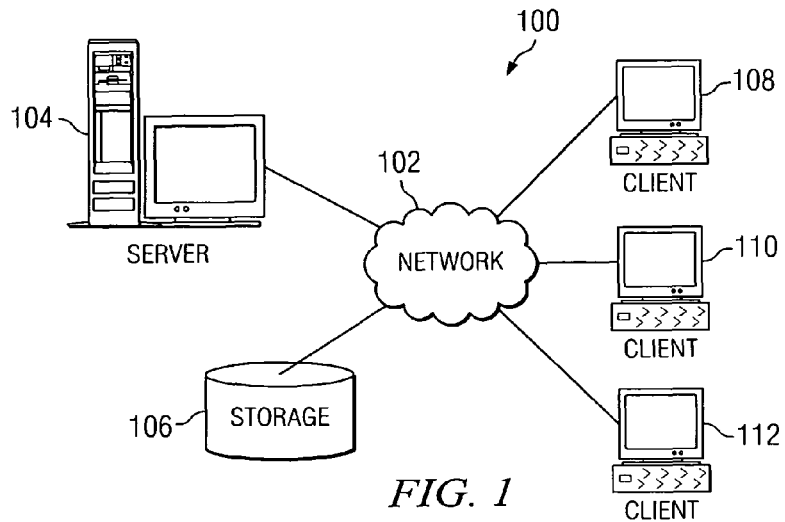
FIG. 1 is an exemplary pictorial representation of a distributed data processing system in which the present invention may be implemented.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108-112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

Figure 2A:
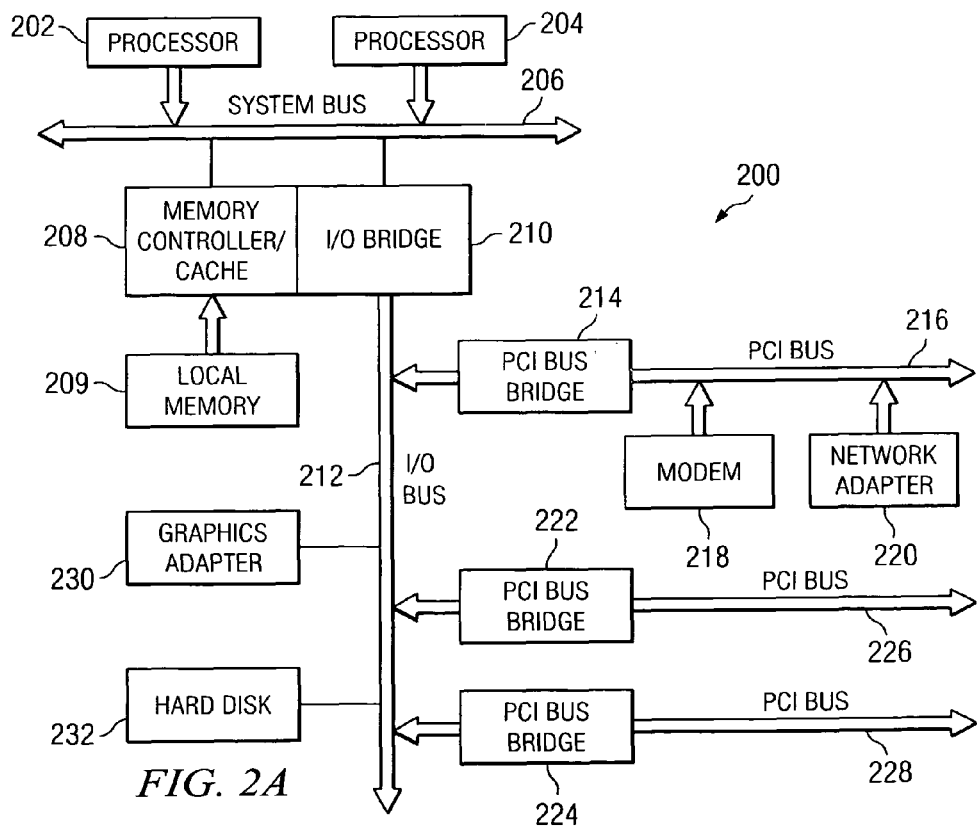
FIG. 2A is an exemplary block diagram of a server data processing system in which aspects of the present invention may be implemented.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

With reference now to FIG. 2B, a block diagram of a data processing system in which the present invention may be implemented is illustrated. Data processing system 250 may be a stand alone computing device or may be an example of a client computer, such as that shown in FIG. 1. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, CD-ROM 280, and DVD 282 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS For Business™ or OS/2™, which are available from International Business Machines, Inc. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

As described in "APPARATUS AND METHOD FOR AUTONOMIC HARDWARE ASSISTED THREAD STACK TRACKING", incorporated by reference above, a method is provided to store thread tracking information automatically through the use of an allocated thread work area. A trace application or post-processing application may use the thread tracking information to obtain performance information for the trace of a computer program. In addition, the thread tracking information may be used to determine computer program flow during execution of the program in combination with cataloged symbolic data, which is described in further details in the present invention. To present a background, a brief overview of trace applications and post processing applications will be provided.

Figure 3:
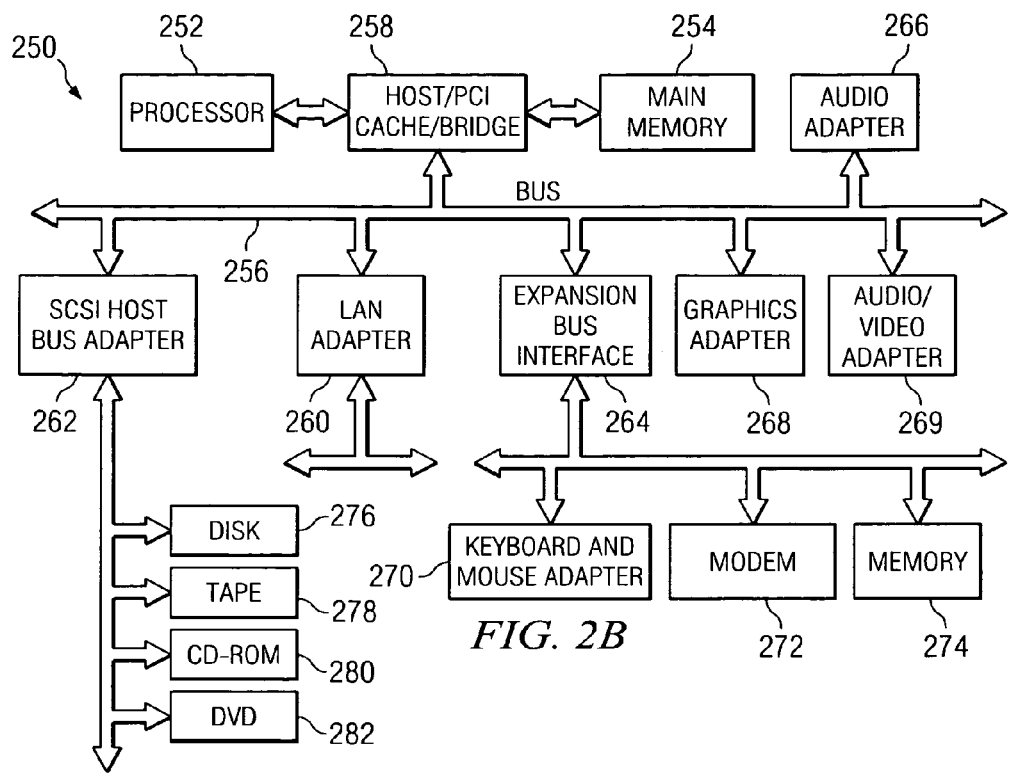
FIG. 3 is an exemplary block diagram depicting components used to perform performance traces of processes in a data processing system.
Figure 3:
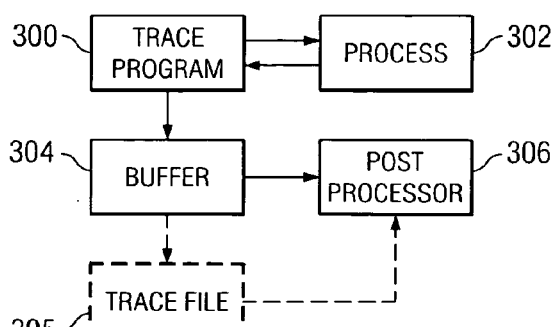

With reference now to FIG. 3, a block diagram depicts components used to perform performance traces of processes in a data processing system. Trace program 300 is used to profile process 302. Trace program 300 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 300, which stores the trace data in buffer 304. In addition, with the hardware assisted thread stack tracking mechanism described in related patent application "APPARATUS AND METHOD FOR AUTONOMIC HARDWARE ASSISTED THREAD STACK TRACKING", which is incorporated by reference above, thread tracking information may be sent automatically to the designated thread work area upon detection of a method entry or exit.

The trace data in buffer 304 may be subsequently stored in trace file 305 or a consolidated buffer when buffer 304 is filled for post-processing. Alternatively, the trace data may be processed in real-time. The trace data in either buffer 304 or trace file 305 is then processed by post-processor 306. Post-processor 306 processes the trace data to generate an indexed database of symbolic data for loaded modules, as described more fully hereafter.

In a non-Java environment, trace hooks may be employed that aid in the identification of modules that are used in an application under trace. With Java operating systems, trace hooks may be employed that aid in identifying loaded classes and methods.

In addition, since classes and modules may be loaded and unloaded, these changes may also be identified using trace data. This is especially relevant with "network client" data processing systems, such as those that may operate under Java OS, since classes and jitted methods may be loaded and unloaded more frequently due to the constrained memory and role as a network client. Note that class or module load and unload information are also relevant in embedded application environments, which tend to be memory constrained.

Figure 4:
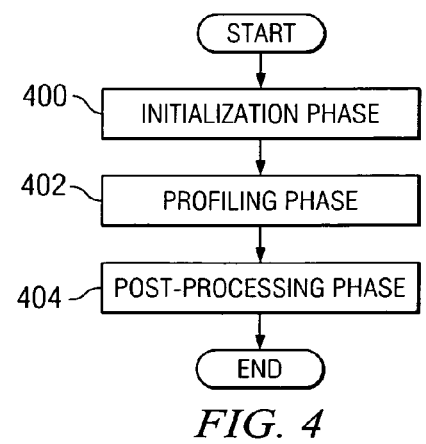
FIG. 4 is a diagram depicting various phases in performing a performance trace of the workload running on a system.

With reference now to FIG. 4, a diagram depicts various phases in performing a performance trace of the workload running on a system. Subject to memory constraints, the generated trace output may be as long and as detailed as the analyst requires for the purpose of profiling a particular program.

An initialization phase 400 is used to capture the state of the client machine at the time tracing is initiated. This trace initialization data includes trace records that identify all existing threads, all loaded classes (modules), and all methods (sections) for the loaded classes (modules). Records from trace data captured from hooks are written to indicate thread switches, interrupts, and loading and unloading of classes (modules) and "jitted" methods (sections).

Any class (module) which is loaded has trace records that indicate the name of the class (module) and its methods (sections). Numeric IDs may be used as identifiers for threads, classes, and methods. These IDs are associated with names that have been output in the trace records. A trace record is written to indicate when all of the start up information has been written.

During the profiling phase 402, trace records are written to a trace buffer or trace file. In the present invention, a trace buffer may have a combination of types of records, such as those that may originate from a trace hook executed in response to a particular type of event, e.g., a method entry or method exit, and those that may originate from a stack walking function executed in response to a timer interrupt, e.g., a stack unwind record, also called a call stack record.

For example, the following operations may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed, for example.

In the post-processing phase 404, the data collected in the trace buffer is processed or sent to a trace file or a consolidated buffer if the trace buffer is filled for post-processing. In one configuration, the file may be sent to a server, which determines the profile for the processes on the client machine. Of course, depending on available resources, the post-processing also may be performed on the client machine.

As mentioned previously, the present invention provides a method, apparatus, and computer instructions for determining computer program flows autonomically using hardware assisted thread stack tracking and cataloged symbolic data. One embodiment of the present invention provides three hardware registers: a work area register, which includes a pointer pointing to the beginning of the allocated thread work area; a current pointer register, which includes a pointer pointing to the location of the last written call stack entry; and a work area length register, which indicates the length of the work area. Alternatively, instead of the work area length register a pointer pointing to the end of the allocated thread work area may be used.

With the present invention, the functionality of microcode currently existing in a processor is extended by programming instructions for establishing work areas and monitoring the execution of instructions to determine how to update the thread tracking information in the thread work areas. Microcode is a permanent memory that holds the elementary circuit operations a computer must perform for each instruction in its instruction set. Microcode acts as a translation layer between the instruction and the electronic level of the computer.

In a preferred embodiment, when a new thread is spawned during execution of a computer program, the operating system or the device driver of the client device, such as data processing system 250 in FIG. 2, instructs the processor to allocate a new thread work area in memory. The work area register is set with a pointer pointing to the newly allocated thread work area. Initially, the work length register is set with a fixed length as notified by the operating system during initialization phase.

As the program is executed, thread tracking information, including call stack entries, are written to the designated thread work area by microcode of the processor in a manner described in the related patent application "APPARATUS AND METHOD FOR AUTONOMIC HARDWARE ASSISTED THREAD STACK TRACKING", which is incorporated by reference above. Upon detection of a method entry or exit, call stack entries are written to the designated thread work area in two modes. In one mode, entries are written continuously to the call stack. Alternatively, in a call stack mode, entries are pushed onto the call stack when a method entry is detected and popped off the call stack when a method exit is detected. A call stack entry includes information for a method entry/exit during execution of a spawned thread, such as a timestamp when the method is called or returned, address from which a call is made, address of the called method, and a return-to address. The operating system notifies the processor to update the pointer in the current pointer register with a new location each time a call stack entry is written.

Subsequently when a context switch occurs, meaning when a different thread is dispatched during executing of the computer program, values in the three registers are saved away by the processor in a context save area, which stores context information for a particular thread. The context save area may be within the thread work area or other location in memory. Upon reactivation of the thread by the program, the operating system or device driver instructs the processor to restore saved values from the context save area to the three registers.

Prior to writing each call stack entry, the mechanism of the present invention determines if the designated thread work area is about to overflow based on pointers stored in the work area length register and the current pointer register. An overflow may occur, for example, when the call stack is filled as entries are written to the stack. If an overflow is about to occur, the present invention sends an interrupt to the operating system or a performance monitoring application, which is an application that monitors performance of the system.

During the post-processing phase, which may occur during or after the profiling phase, a trace application or a post-processing application may utilize the call stack date for determining computer program flow. The trace application or the post-processing application may perform, in one mode of operation, a full trace of a computer program, including all executing threads, by reading stored call stack data from the consolidated buffer. The stored call stack data includes call and return operations during execution of each thread.

In this mode, the operating system, or the performance monitoring application, copies the call stack entries from the designated thread work area to a consolidated buffer when the thread work area is filled. A consolidated buffer is similar to a trace buffer except that the consolidated buffer is written to only when the stack is filled or when the data is purposely copied by the operating system or the device driver. The data in the consolidated buffer may eventually be copied to a disk or other buffer within the user space.

Alternatively, a sample trace of a computer program may be performed by a trace application in a call stack mode. In the call stack mode, entries are pushed onto and popped from the call stack as call or return operations are detected during execution of a thread. In this mode, the trace application wakes up by an interrupt, which may be a timer interrupt that expires periodically being generated. The trace application then requests the operating system to take a snapshot of the call stack entries in the thread work area in order to determine the current program flow. Similar to the above, the operating system or the device driver may then copy the call stack entries from the thread work area(s) to the consolidated buffer.

In either mode of operation, the microcode of the processor may be programmed to store additional information when writing call stack entries. Examples of additional information include time stamps and values of selected performance monitoring counters. A performance monitoring counter is a hardware counter placed inside of a processor to monitor performance of the system. The performance monitoring counters may be programmed to count various events, such as, instructions completed, cache misses, etc. By including additional information, such as instructions completed, in the call stack entries, other useful program related information may be recorded for user analysis. This additional information may be compressed or consolidated with other information in the call stack entry when the entry is written to the call stack or when the call stack entries are copied from the thread work are to the consolidated buffer during post-processing.

Figure 5A:
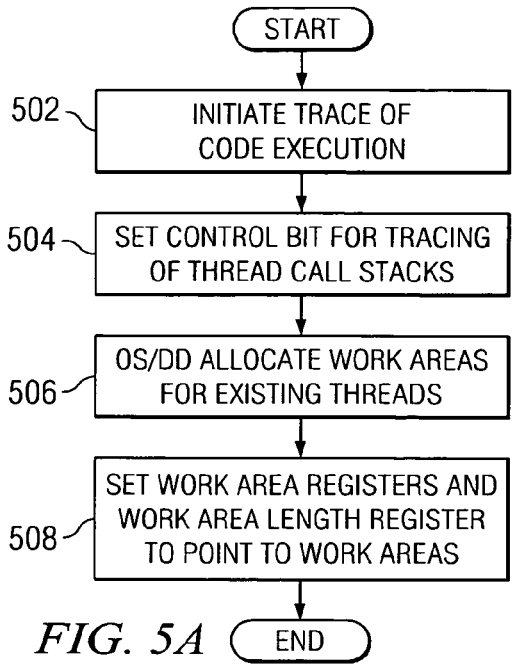
FIG. 5A is a flowchart illustrating an exemplary process of initiating hardware thread stack tracking in accordance with a preferred embodiment of the present invention.

Turning now to FIG. 5A, a flowchart illustrating an exemplary process of initiating hardware thread stack tracking is depicted in accordance with a preferred embodiment of the present invention. The process begins when the trace of code execution is initiated by a user (step 502). Next, the control bit for storing thread tracking information is then set in the processor (step 504). The control bit is located in a control register of the processor. By setting the control bit, hardware thread tracking is enabled. Alternatively, other indications of hardware thread tracking may be used, such as having a non-zero value in the work area register or a non-zero value in the work area length register, for example. When a new thread is spawned during code execution, the operating system or device driver allocates a work area for the new thread (step 506) and sets the work area register to point to the beginning address and to store the length of newly allocated work area in the work area length register (step 508). Initially, the size of the work area is fixed, but may be extended if necessary. The operation then terminates.

Figure 5B:
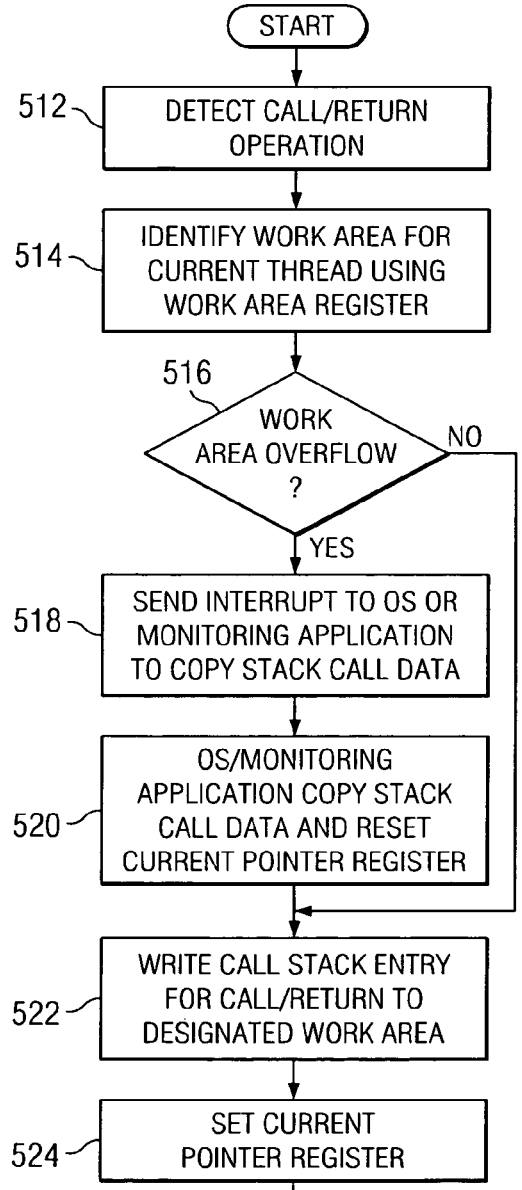
FIG. 5B is a flowchart illustrating an exemplary process of writing hardware thread tracking information to the allocated thread work area as events occurs in one mode of operation in accordance with a preferred embodiment of the present invention.

Turning now to FIG. 5B, a flowchart illustrating an exemplary process of writing hardware thread tracking information to the allocated thread work area as events occur in one mode of operation is depicted in accordance with a preferred embodiment of the present invention. The process begins when the processor detects a call or return operation (step 512). The processor may then identify the location of the work area using the value of work area register added to the value of the current pointer register (step 514).

Next, prior to writing an entry for the call or return operation, a determination is made by the trace application as to whether an overflow occurs in the thread work area (step 516). The determination is based on the value of the current pointer register, the work area length register, and the amount of data to be written.

If an overflow is about to occur, an interrupt is sent by the trace application to the operating system or a performance monitoring application (step 518) in order to copy call stack data from the designated thread work area to the consolidated buffer and reset the current pointer register (step 520). If no overflow is about to occur, the process continues to step 522.

At step 522, the processor writes the call stack entry for the call or return operation to the designated thread work area. The trace application then sets the current pointer register pointer to the location of the last entry written in the designated work area (step 524). The operation then terminates.

When a different thread is dispatched the values of the current hardware control registers are saved away in a context save area, and previous values or new values for the current thread are restored/generated and stored in the three registers. Thus, the process repeats for the newly dispatched thread beginning at step 512. In this mode of operation, new entries for either a call or a return operation are pushed onto the stack and thus, a full trace of the computer program is performed by the trace application to capture both call and return operations.

Figure 5C:
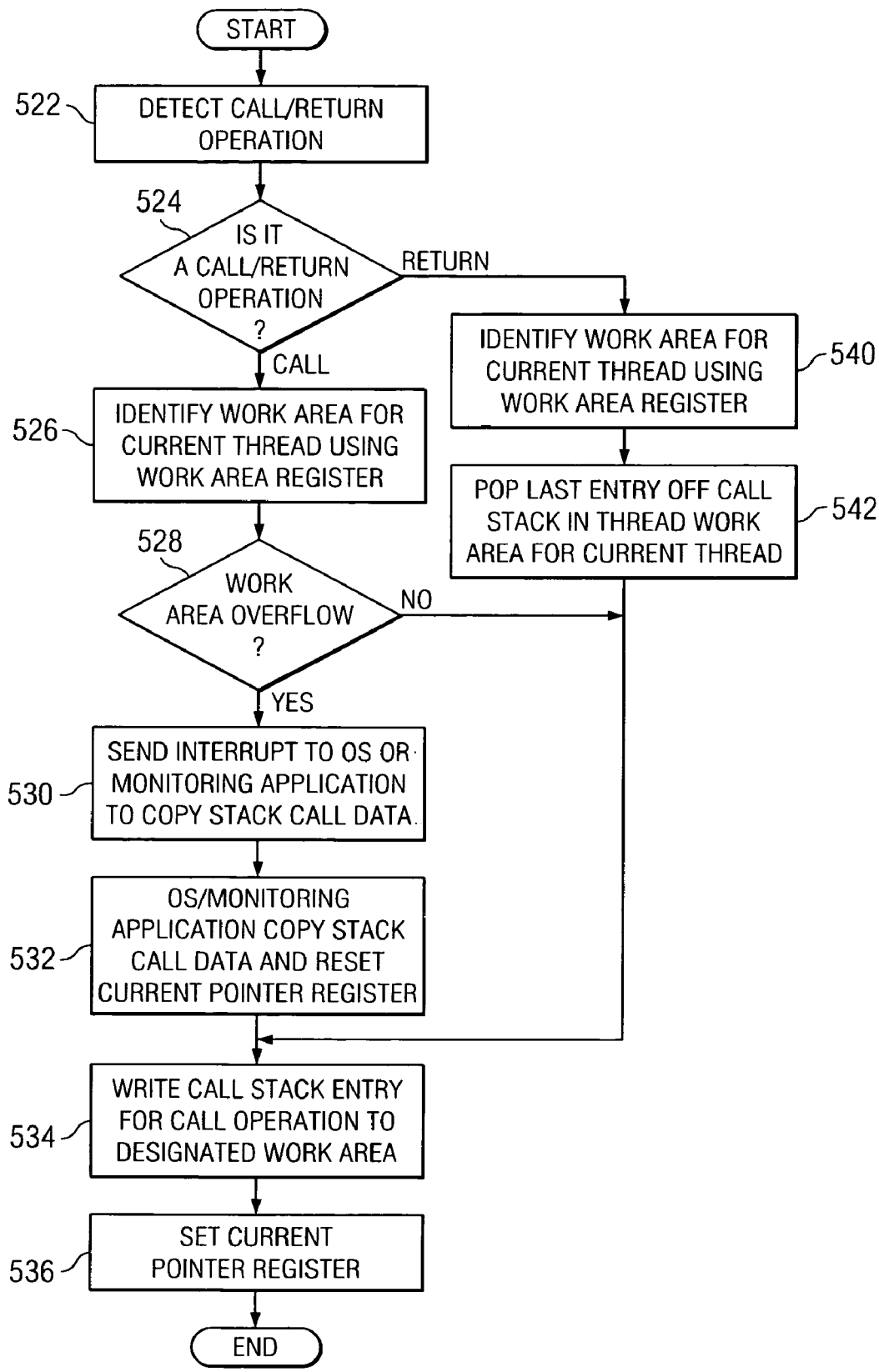
FIG. 5C is a flowchart illustrating an exemplary process of writing hardware thread tracking information to the allocated thread work area as events occurs in call stack mode of operation in accordance with a preferred embodiment of the present invention.

Turning next to FIG. 5C, a flowchart illustrating an exemplary process of writing hardware thread tracking information to the allocated thread work area, as events occur in a call stack mode of operation, is depicted in accordance with a preferred embodiment of the present invention. The process begins when the processor detects a call or return operation (step 522). A determination is then made by the processor as to whether the operation is a call or return (step 524).

If the operation is a return operation, the processor identifies the location of a designated work area for the thread using the pointer to the work area register (step 540). The processor then pops the last entry off the call stack in the designated thread work area (step 542) and the process continues to step 534.

However, if the operation is a call operation, the processor may then identify a location of the work area using the pointer to the work area register (step 526). Next, prior to writing an entry for the call operation, a determination is then made by the trace application as to whether an overflow is about to occur in the thread work area (step 528). The determination is based on the value of the current pointer register, the work area length register, and the amount of data to be written. If no overflow is about to occur, the process continues to step 534. However, if an overflow is about to occur, an interrupt is sent by the hardware to the operating system (step 530) or performance monitoring application in order to copy call stack data from the designated thread work area to the consolidated buffer and reset the pointer in the current pointer register (step 532). The process then continues to step 534.

At step 534, the processor writes the call stack entry for the call operation to the designated thread work area. The trace application then sets the pointer in the current pointer register to point to the locator of the last entry written in the designated work area (step 536). The operation then terminates.

When a different thread is dispatched the values of the current hardware control registers are saved away in a context save area and previous values or new values for the current thread are stored in the hardware control registers. Thus, the process repeats for the current beginning at step 522. In a call stack mode of operation, a sample trace of the computer program is performed to capture only call operations.

Figure 6:
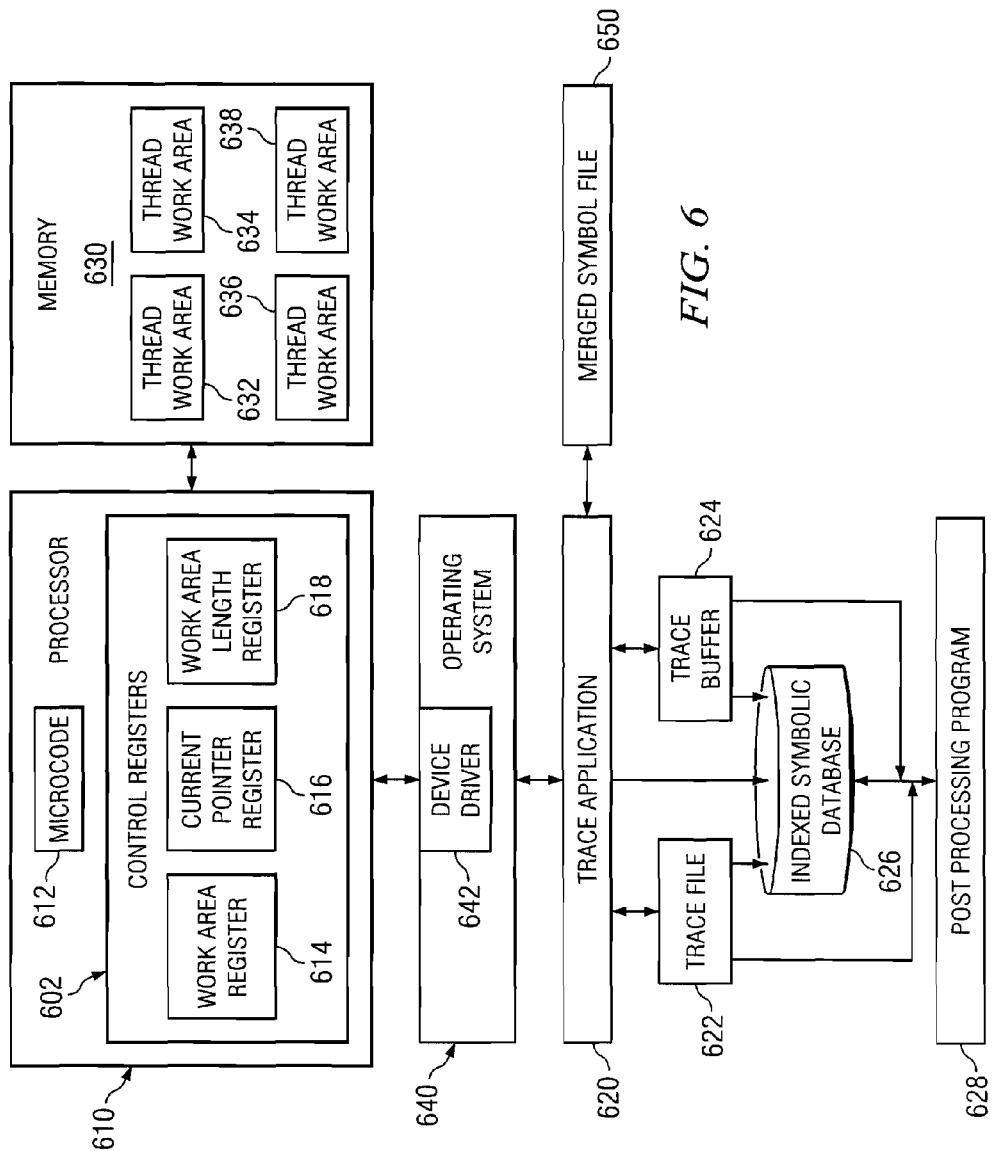
FIG. 6 is a diagram illustrating primary operational components according to one exemplary embodiment of the present invention.

With reference now to FIG. 6, a diagram illustrating primary operational components according to one exemplary embodiment of the present invention is depicted. During the initialization phase of a performance tracing program, such as the initialization phase 400 in FIG. 4, trace application 620 may instruct the operating system 640 regarding size of the thread work area to be allocated for threads of the computer program. The size of the thread work area that is to be allocated for each thread may be extended when necessary. Device driver 642 of operating system 640 may set a control bit in the processor 610 to indicate that hardware thread tracking is to be performed. Operating system 640 may then allocate a portion of the system memory 630 for use as the work areas for thread tracking information.

When a new thread is created during execution of the computer program, operating system 640 allocates a thread work area, such as thread work area 632, for the new thread in the computer program, in which the thread's call stack information is to be stored. Each thread corresponds to a thread work area. Therefore, thread work areas 632-638 corresponds to four different threads. The beginning address of the allocated thread work area is stored in work area register 614 and the length for the work area is stored in work area length register 618, both of which are part of control registers 602 of processor 610.

In addition, current pointer register 616 is provided within control registers 602. Current pointer register 616 is used to identify the location of the work area to which an entry is written. In this way, the currently active location of the thread work area may be identified.

When a different thread is created during execution of the computer program, hence when a thread context switch occurs, the values in hardware registers 614-618 may be updated. The values are first saved by the operating system 640 or device driver 642 to a context save area, which has the context of the current thread. The context save area may be within thread work area 632 or another dedicated location (not shown) in memory 630. Next, operating system 640 or device driver 642 restores previously saved values, or generates new values, for the initiated thread and saves them in hardware registers 614-618.

As described previously, the present invention extends current functionality of the microcode in a processor to include the additional functionality and operations discussed herein. For each existing thread, operating system 640 allocates a portion of memory 630 for use in storing one or more thread work areas. This portion of memory 630 has a size equal to the fixed size determined in the initialization phase. Microcode 612 then begins to monitor the instructions executed by processor 610 to determine if a new thread is spawned, if a memory overflow occurs, if a method/routine entry (call) instruction is executed, and if a method/routine exit (return) instruction is executed.

Also described above, if a new thread is spawned, a new thread work area, such as thread work area 634, in the system memory 630 may be created and a context switch may be communicated to the microcode 612 so that the values in hardware registers 614-618 identifying the last work area accessed may be updated to point to the new thread work area.

If memory overflow occurs, operating system 640 or device driver 642 may capture call stack information in the thread work area for the associated thread instead of extending the thread work area. As described in the related patent application "APPARATUS AND METHOD FOR AUTONOMIC HARDWARE ASSISTED THREAD STACK TRACKING, which is incorporated by reference above, the thread work area may be extended when an interrupt is sent from microcode 612 of processor 610 to operating system 640 in response to a thread work area overflow. Operating system 640 may extend thread work area by including an extension area. Work area register 614, current pointer register 616, and the work area length register 618 may all be impacted as a result of the extension.

However, in the present invention, instead of extending the thread work area in response to an overflow, the call stack information may be captured by operating system 640 to a new thread work area, such as trace buffer 624 or trace file 622, which is accessible by a trace application or a post-processing application.

If a method/routine entry (call) instruction is executed, then a call stack entry for the method/routine is created by the processor in the appropriate thread work area indicating the entry of a method/routine, i.e. a call stack entry is pushed onto the call stack by the processor.

If a method/routine exit (return) instruction is executed, a call stack entry for the exiting of the method/routine may be entered by the processor into the call stack of the work area in one mode of operation or popped off from the call stack in another mode of operation, which is referred to previously as the call stack mode.

If a new thread is spawned during the execution of the computer program that is being traced, and thread tracking is enabled in the processor 610 by the setting of the control bit in the processor 610, then a new thread work area is needed in order to track the thread execution. A new thread may be determined to have been spawned by the communication of a context switch by the operating system 640. Similar to the allocation of work areas during initialization, the operating system 640 may allocate a new thread work area, such as thread work area 632, for the new thread by setting work area register 614 of control registers 602 to point to the beginning of the area and designate the length of the thread work area in work area length register 618 of control registers 602.

Thereafter, when the new thread causes an event to occur, such as entry or exit of a method/routine, an entry will be written by the processor to the work area for the new thread having the necessary information for use by trace application 620 or post-processing program 628. Current pointer register 616 is updated by microcode 612 of processor 610 with pointer pointing to location of the last written entry.

If a method/routine entry instruction is executed by processor 610, as determined by whether the instruction executed by the processor 610 is a "call" instruction or not, microcode 612 determines if thread tracking is enabled in the processor 610. That is, microcode 612 determines if the control bit identifying thread tracking to be enabled is set. If the control bit is set and a method/routine entry instruction is executed by processor 610, microcode 612 determines that a call stack event has occurred that requires the creation and storage of a call stack entry in the thread work area for the associated thread.

Microcode 612 identifies the beginning address of the thread work area for the thread by retrieving the address information from work area register 614 of control registers 602 and determines if there is enough room in the thread work area to write the call stack entry for the event. This may be determined by comparing the length of the thread work area, as designated in work area length register 618, to the location of the last entry written to the call stack in the thread work area, as designated in current pointer register 616. If the thread work area has enough remaining storage, a call stack entry for the event is generated and stored in the thread work area for the thread, e.g., thread work area 632. This call stack entry may include, for example, the address of the method/routine being called.

If the thread work area for the thread, e.g., thread work area 632, does not have sufficient storage capacity for a new call stack entry, then microcode 612 identifies the condition as a work area or memory overflow. As a result, microcode 612 sends an interrupt to the trace application code 620 via operating system 640 indicating the work area overflow. In response, trace application code 620 may instruct operating system 640 to capture call stack information in the thread work area for the thread to a new thread work area, such as trace buffer 624 or trace file 622. In response to the instruction to capture the work area for the thread, operating system 640 copies the call stack information and resets values in hardware registers 614-618.

Similar to the operation above with regard to the entry of a method/routine, processor 610 may detect that a method/routine is exited by the execution of a "return" instruction in the code of the computer program. Upon the detection of a "return" instruction, the present invention may add an additional entry to the call stack designating the exit of the method/routine in one mode of operation. In this mode, every method/routine entered and excited during execution of the thread is captured.

Alternatively, the present invention may remove entries for methods/routines that are exited from the call stack in another mode of operation, referred to as call stack mode, to only capture method/routine that entered during execution of the thread.

Thus, as processor 610 executes instructions of the computer program under the trace, operating system 640 automatically allocates new thread work areas for newly spawned threads, writes call stack entries into thread work areas in response to the detection of an entry/exit method/routine event, and captures call stack information when an overflow occurs. As a result, hardware mechanisms of the present invention help to alleviate some of the burden of performing these operations entirely in software. Moreover, since the hardware may operate virtually independently of the trace application and computer program under trace, with regard to these operations, these operations may be performed regardless of the particular trace application or computer program that is executing. Furthermore, the computer program under trace need not be instrumented to obtain the call stack information since this information is automatically obtained by the processor once the trace application indicates that thread tracking is to be enabled.

It should be appreciated that the above operations of the present invention may be initiated at any time during tracing of a computer program. Thus, in one mode of operation, a trace application may wake up as a result of a filled call stack or a timer interrupt, the mechanism of the present invention is initiated to capture call stack information from the thread work area. Alternatively, in a call stack mode, a situation may be present in which the mechanism of the present invention is initiated while method calls are currently outstanding, i.e., a method call has been made and the present invention is initiated prior to the called method being exited. In other words, when in call stack mode, a return operation may be performed without a call operation having been made while the present invention is active. In these situations, such return operations are handled as a no op, that is, no operation.

As described in "APPARATUS AND METHOD FOR CATALOGING SYMBOLIC DATA FOR USE IN PERFORMANCE ANALYSIS OF COMPUTER PROGRAMS", incorporated by reference above, a method is provided for post-processing performance trace data recorded in trace buffer 624 or trace file 622. A merged symbol file, such as merge symbol file 630, is generated for a computer program, or application, under trace. Merged symbol file 630 comprises symbolic data for modules obtained from map files, debug files, non-stripped versions of modules, and other symbolic data files. The merged symbol file contains information useful in performing symbolic resolution of address information in trace files for each instance of a module, such as checksum, timestamp, fully qualified path to the module, length of the module, etc.

During post processing of the trace information generated by a performance trace of a computer program, symbolic information stored in merged symbol file 630 is compared to the trace information stored in trace file 622. The trace information includes information identifying the modules that were called during the trace of the computer application. This trace information, which may be obtained using the hardware thread tracking mechanisms previously described, and the merged symbol file are used to produce reports. The correct symbolic information in merged symbol file 630 for the modules used in the trace is identified based on a number of validating criteria.

The correct symbolic information for the required modules may then be stored as an indexed symbolic database, for example, indexed symbolic database 626, that is indexed using process identifiers and address identifiers. The indexed database of symbolic information may be stored as a separate file or as a separate portion of a trace file for the computer application. Indexed symbolic database 626 may then be used to resolve address information into corresponding symbolic information when providing the trace information for use by a user.

As described above, the symbolic information provides symbolic data for loaded modules/processes, i.e. called module or processes, of the application under trace. As a result of the symbolic resolution, indexed symbolic database 626 for the loaded/called modules/processes is generated by either the trace application 620 or the post-processing program 628.

The indexed database entries may be indexed based on any searchable value. In a preferred embodiment, the indexed database is indexed based on the process identifier (pid) and the segment load address, however, other searchable indices may be used without departing from the spirit and scope of the present invention.

Once indexed symbolic database 626 is generated, trace application 620 or post-processing application 628 may search indexed symbolic database 626 for symbolic information that matches the process identifier (pid) and the address of the method/routine called or returned by each thread. When a match is found, a call sequence may be generated using symbolic data that represents the computer program flow.

Figure 7:
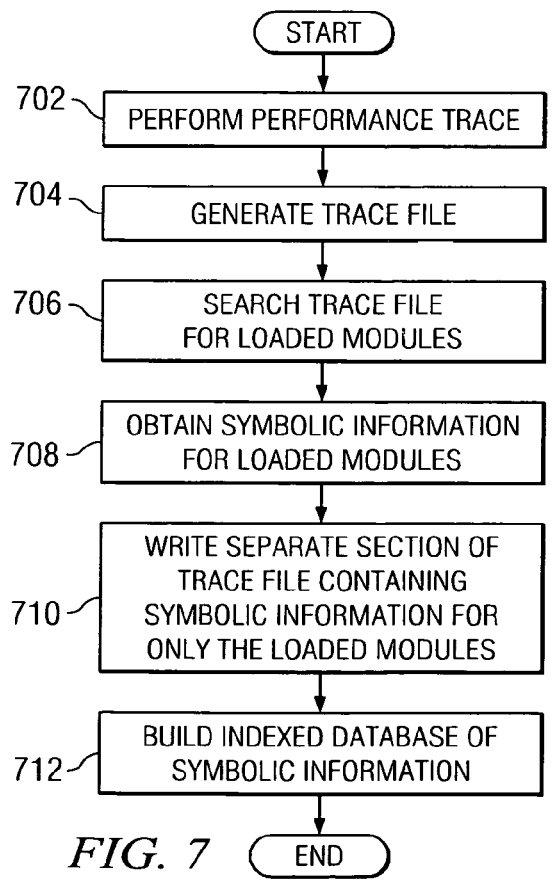
FIG. 7 is a flowchart outlining an exemplary operation of the data processing system of the present invention when dynamically generating an indexed database of symbolic data based on performance trace data stored in the trace buffer in accordance with a preferred embodiment of the present invention.

Turning now to FIG. 7, a flowchart outlining an exemplary operation of the data processing system of the present invention when dynamically generating an indexed database of symbolic data based on performance trace data stored in the trace buffer is depicted in accordance with a preferred embodiment of the present invention. The steps shown in FIG. 7 are repeated for new performance trace data written to the trace buffer. In this way, an indexed database of symbolic data is dynamically created as the application is under trace.

As shown in FIG. 7, the operation starts with a performance trace of the computer program being performed (step 702) and a trace file being generated (step 704). The trace file is searched for loaded/called module entries (step 706) and symbolic data for the loaded/called modules is obtained (step 708). The symbolic data is preferably obtained from a merged symbol file. These steps are normally performed by a trace application.

Once the symbolic data is obtained for the loaded/called modules, the symbolic data is stored as a separate section of the trace file containing only the symbolic data for the loaded modules (step 710). This symbolic data is then indexed to generate an indexed database of symbolic data for the loaded modules as a separate section of the trace file (step 712) and the process terminates thereafter.

Thus, an indexed database of symbolic data for loaded modules is obtained by gathering symbolic data from a plurality of sources into a merged symbol file, such as merged symbol file 650 in FIG. 6, and then comparing this merged symbol file with performance trace data that is stored in either the trace buffer or in a trace file on a storage device. Matching symbolic data is then written to an indexed database in correspondence with the performance trace data.

Figure 8A:
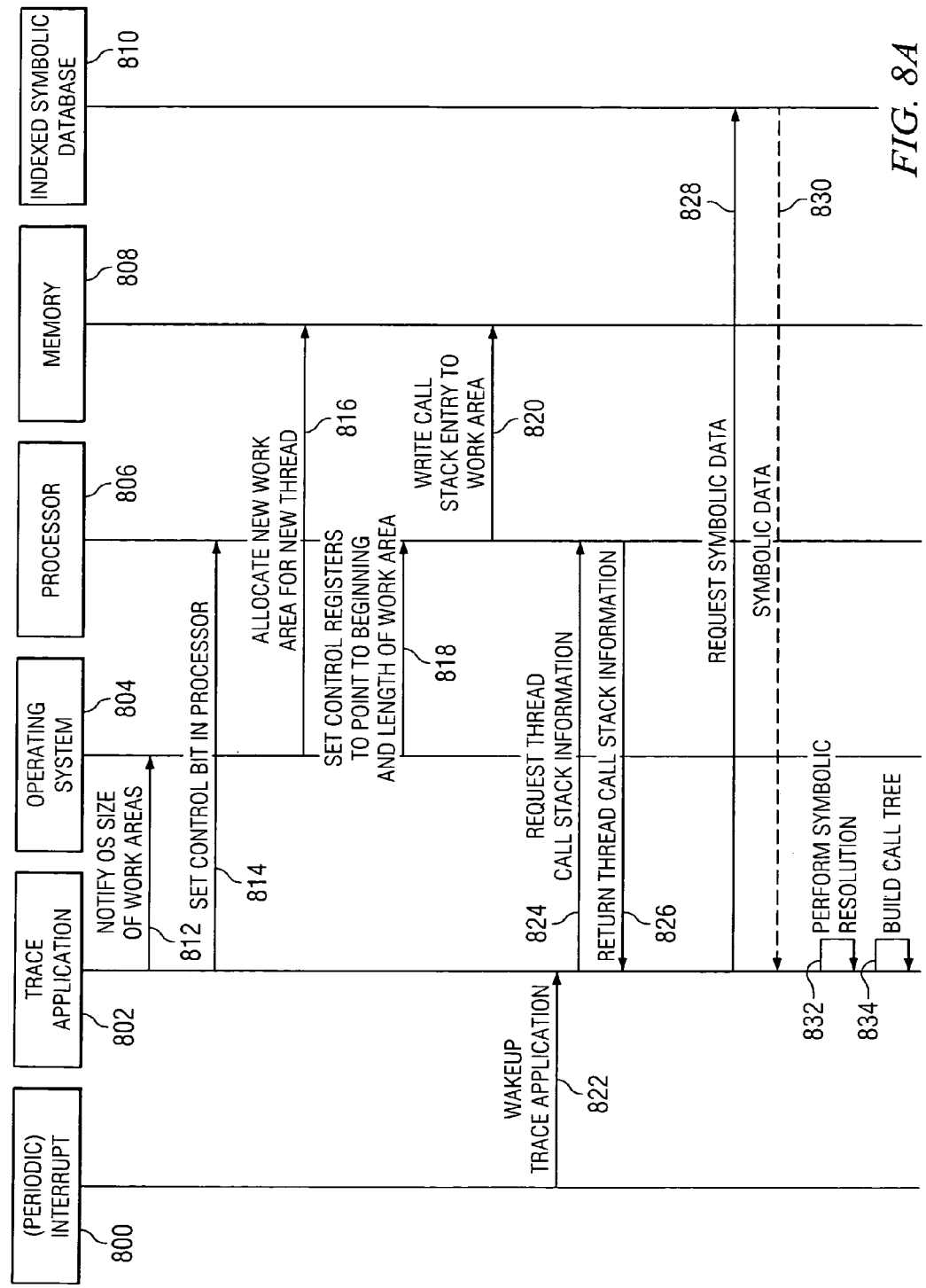
FIG. 8A is a diagram illustrating interactions between components during post-processing by a trace application in accordance with a preferred embodiment of the present invention.

Turning next to FIG. 8A, a diagram illustrating interactions between components used in the present invention during post-processing by a trace application is depicted in accordance with a preferred embodiment of the present invention. Post-processing may actually occur during or after the tracing phase. In this example, post-processing is performed during the performance trace by trace application 802. The operation starts when trace application 802 informs operating system 804 of the size of the work areas for storing thread tracking information. e.g., call stack information (operation 812). Next, trace application 802 instructs processor 806 to set the thread tracking enabled control bit in the control bit register (operation 814).

The operating system 804 then allocates the new work areas for new threads (operation 816) of the computer program by allocating address ranges in memory 808 for each thread. Operating system 804 then instructs processor 806 to set the work area register to point to the beginning address and stores the length for the work area, which is initially fixed, in the work area length register (operation 818). Thereafter, as call stack events occur, processor 806 writes call stack entries to the appropriate work areas in memory 808 (operation 820).

At some time later, a wakeup of trace application 802 is caused by an interrupt (operation 822). The interrupt may be initiated when the trace buffer is filled or by a periodic timer. Trace application 802 then requests the thread call stack information (operation 824) from processor 806. Next, trace application 802 notifies processor 806 to retrieve call stack information (operation 826) via operating system 804 using the pointer stored in the current pointer register. The call stack information retrieved may be copied to a consolidated buffer that is accessible in the application space. Once the call stack entries are copied to the consolidated buffer, the operating system or the performance monitoring application maps each thread back to the process to which the thread belongs.

The call stack information for the threads of interest may then be processed by trace application 802. This is accomplished by reading the call stack entries from the consolidated buffer to identify the thread-process relationship. Typically, when a thread is created, it is created within a process. The operating system may provide an interface to identify the process and another interface to identify the thread. In addition, the thread-process information is known by the operating system at thread creation time.

Alternatively, at dispatch time, which is when a thread is dispatched and starts executing, both the process identifier and corresponding thread identifier are known to the operating system. This information is known to the operating system, because the addresses of the dispatched process and thread have fixed locations or symbolic names. When the dispatcher chooses the process and thread to dispatch, a trace record may be written by the operating system or kernel extension identifying the process and thread being dispatched. From this trace record, a process identifier and a thread identifier may be retrieved.

Thus, trace application 802 may request symbolic data (operation 828) from the indexed symbolic database 810. A search is performed by trace application 802 for symbolic data. An example of retrieved symbolic data is "C:\System\user.dll(function1)". The search for symbolic data is based on the process identifier and address of the method calls or returns for each thread. The address of a call operation is the address to where the processor will transfer control when the call operation is executed. Typically, a "from" and a "to" address are written to the call stack in the thread work area. An example of an address is "0x80140000". This address information may be in a compressed form when it is written to the call stack along with additional information such as time stamps and performance monitoring counter values. Alternatively, a consolidation and/or compression may be made at the time the call stack data is copied from the thread work area to the consolidated buffer.

Once the symbolic data is retrieved for the call stack information (operation 830) trace application 802 performs symbolic resolution (operation 832). Lastly, trace application 802 generates a call tree or sequence using the symbolic data (operation 834), which depicts the computer program flow.

Figure 8B:
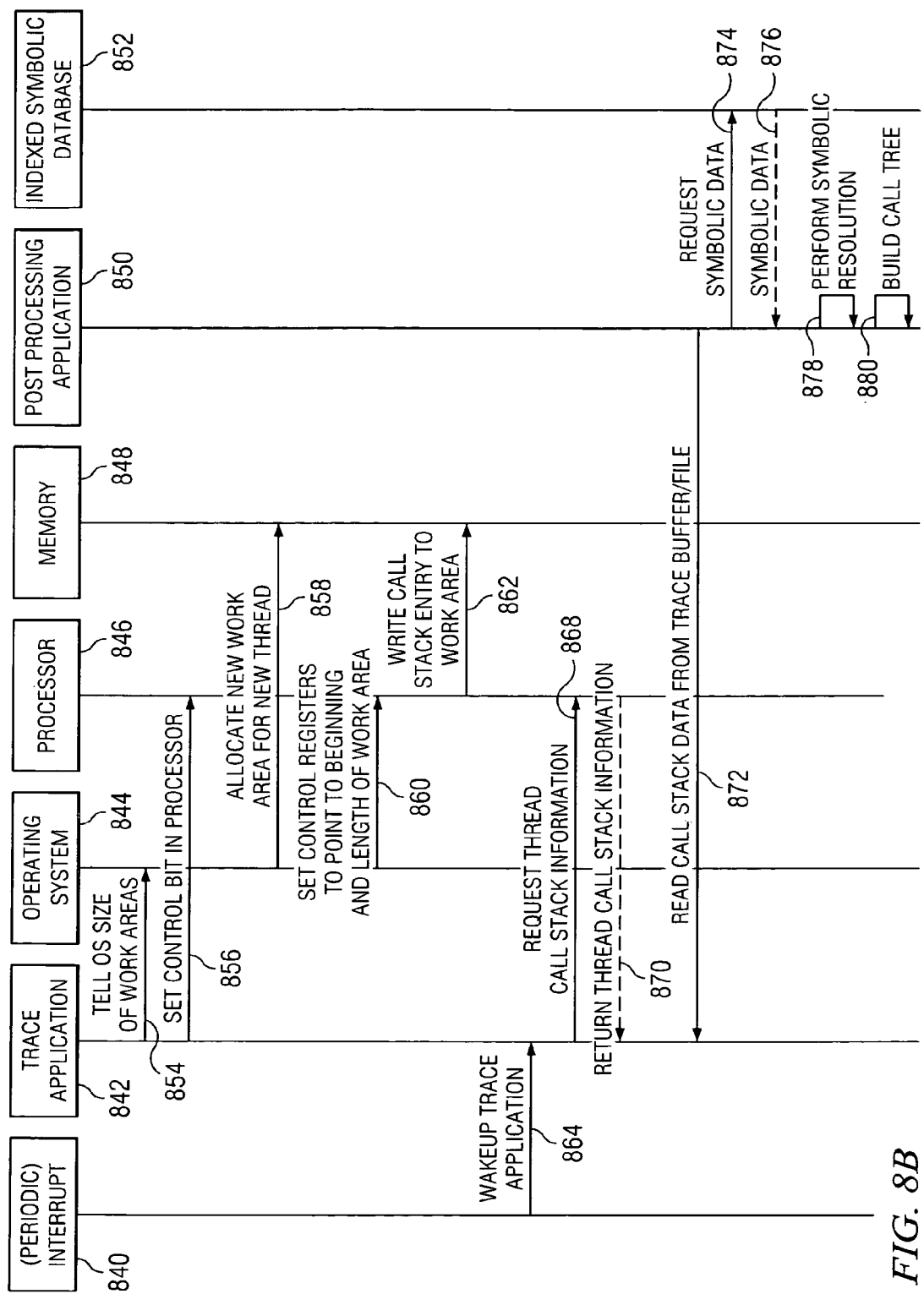
FIG. 8B is a diagram illustrating interactions between components during post-processing by a post-processing application in accordance with a preferred embodiment of the present invention.

Alternatively, the post-processing may be performed by a post-processing program after the profiling phase. Turning now to FIG. 8B, a diagram illustrating interactions between components used in the present invention during post-processing by a post-processing application is depicted in accordance with a preferred embodiment of the present invention. As shown in FIG. 8B, operations 854-870 occur in a similar manner as operations 812-826 described in FIG. 8A. However, instead of trace application 842, post-processing application 850 now performs post-processing of the call stack information retrieved from processor 846 after the profiling or tracing phase has taken place.

Post-processing application 850 reads call stack data from a trace buffer or file (operation 872) retrieved by trace application 842. The trace buffer may be the consolidated buffer, which includes call stack data copied from thread work areas during execution of the program code. Once the call stack data is read from the consolidated buffer, post-processing application 850 may request symbolic data (operation 874) from indexed symbolic database 852 based on the process id and the address of method calls or returns for each thread. Once symbolic data is retrieved (operation 876), post-processing application 850 may perform symbolic resolution (operation 878) and generate a call tree or sequence of the computer program based on the symbolic data (operation 880).

Turning next to FIG. 9A, a flowchart process illustrating an exemplary process of determining computer program flow autonomically using thread stack tracking information and cataloged symbolic data when post-processing is performed during profiling is depicted in accordance with a preferred embodiment of the present invention. In this example, post-processing is performed at run time by the trace application. The process begins when a trace application wakes up periodically (step 902). The trace application wakes up periodically when a timer expires or when the trace buffer is filled.

Upon waking up, the trace application requests call stack data from the processor (step 904). The processor identifies the address of the thread work area using the pointer to the work area register. Next, the device driver in the operating system copies the call stack data to a trace buffer or file (step 906). The trace buffer may be a consolidated buffer where call stack data for each thread may be stored. When the call stack data is copied from the thread work area, other processing may occur, such as, compressing or consolidating the call stack data with additional information, such as, time stamps and performance monitoring counter values. Next, the trace application reads the call stack data in the trace buffer or consolidated buffer (step 908).

In order to retrieve symbolic data, the device driver, the operating system, or a performance monitoring application maps each thread to a process (step 910). The mapping is performed by locating a process identifier (pid) that corresponds to the thread identifier specified in the call stack data. Once the mapping is complete, the trace application searches the indexed symbolic database for symbolic data that matches process id and address of each method call or return for each thread (step 912). Based on the retrieved symbolic data, a call tree or sequence is generated by the trace application that describes the execution flows of a computer program (step 914). The operation then terminates.

In an alternative embodiment, rather than searching the indexed symbolic database, other methods may be used to retrieve the symbolic data. These methods include examining the loaded/called module itself if the address of the loaded/called module on a disk is known, examining other symbolic data in the same directory as the load/called module, and examining symbolic data in a shadow directory. A shadow directory is a directory that resides in a separated location on the same data processing system.

Turning next to FIG. 9B, a flowchart process illustrating an exemplary process of determining computer program flows autonomically using thread stack tracking information and cataloged symbolic data when post-processing is performed after profiling is depicted in accordance with a preferred embodiment of the present invention. In this example, post-processing is performed by the post-processing application after profiling phase. The process begins when the post-processing application requests call stack data from the processor (step 920). The processor identifies location of the thread work area using the pointer to the work area register. Once the thread work area location is identified, the device driver in the operating system copies the call stack data to a trace buffer or trace file (step 922). The trace buffer may be a consolidated buffer where call stack data for each thread is stored. The post-processing application then reads the call stack data from the trace or consolidated buffer (step 924).

Similar to the process in FIG. 9A, the device driver, the operating system, or the performance monitoring application maps each thread to a process (step 926) in order to retrieve symbolic data. Once the mapping is complete, the post-processing application searches the indexed symbolic database for symbolic data that matches the process identifier (pid) and the address of each call or return for each thread (step 928). Once the symbolic data is retrieved, the post-processing application generates a call tree or sequence using the retrieved symbolic data (step 930) that describes the execution flows of the computer program. The operation then terminates.

Turning next to FIG. 10, a diagram illustrating an example indexed symbolic database, example call stack entries, and an example call sequence is depicted in accordance with a preferred embodiment of the present invention. Indexed database 1000 includes entries 1010. Each entry includes an index, such as index 1012. Index 1012 is represented using a process identifier and address for the method call or return (pid: address). Corresponding to each index is the symbolic data that represents the subroutine name. For example, for index 1012 with a pid of 1 and an address of 80140000, corresponding symbolic data 1020 is C:\SYSTEM\foo.exe(subroutine1). Thus, when a particular pid:address is encountered in the performance trace file, the pid:address may be converted into a particular symbolic location of a particular location within an executable file. The symbol itself corresponds to a subroutine (or a method).

When a trace application wakes up or when a post-processing application requests call stack data, the operating system or device driver copies the call stack data from the thread work area to a trace or consolidated buffer. In this example, thread 1 call stack 1030 is copied. When the device driver the operating system or a performance monitoring application maps thread 1 to a process, it is mapped to pid of 1. Thread 1 call stack 1030 includes 5 entries, entries 1040. Entries 1040 are arranged in the order the method is called or returned. For example, entry 1042 is called prior to entry 1044 when thread 1 is executed. Thus, entries 1040 depict the computer program flow when thread 1 is executed.

Based on entries 1010 in indexed symbolic database 1000 and entries 1040 in thread 1 call stack 1030, trace application or post-processing application may generate call tree or sequence 1050 after symbolic resolution is performed for pid 1. In call sequence 1050, method C:\SYSTEM\foo.exe(subroutine1) 1052 is first called by pid 1. Subsequently, method C:\User\foo.dll(subroutine1) 1054 is called, followed by method C:\SYSTEM\foo.exe(subroutine2) 1056 and C:\User\foo.dll(subroutine2) 1058.

Thus, using the call stack data copied for a thread of the computer program, along with mapping of a thread to a process, the index symbolic database is searched for symbolic data that corresponds to each thread of a computer program. Hence, a call tree or sequence may be generated using the symbolic data that represents the computer program flow.

In summary, the present invention provides hardware registers necessary to manage thread work areas in memory, which store call stack information for events that occur during execution of a computer program. In addition, the present invention extends the functionality of microcode in existing processors to manage updates of the hardware registers and allocation of thread work areas. The microcode may be programmed to store additional information, such as, time stamps and values of performance monitoring counters, in call stack entries of the thread work area. By storing additional information, such as, instructions completed, the call stack data may include instructions that are completed for each subroutine that is executed in each thread of a computer program. This data provides valuable program related information to the user. These innovative mechanisms aid in determining computer program flow more efficiently without the need for a large memory footprint. Furthermore, the mechanisms of the present invention enable the integrated use of an indexed symbolic database and thread stack tracking information to generate symbolic data for the computer program flow that is readable by a user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for autonomically determining execution flow of a computer program, comprising:

setting a thread tracking control bit in a processor of the data processing system to enable thread tracking by the processor;

providing a set of hardware registers for identifying a work area for a thread of the computer program, wherein the work area stores thread tracking information for the thread, and wherein the set of hardware registers includes a current pointer register and a work area length register, and wherein the current pointer register includes a pointer pointing to a location of the work area where last thread tracking information is written;

detecting, by the processor, a particular type of operation responsive to setting the control bit;

responsive to detecting, and before executing, the particular type of operation: determining, by a trace application, whether an overflow is about to occur in the work area using the current pointer register, the work area length register, and a total amount of data in the operation;

responsive to the trace application determining that an overflow is about to occur in the work area, sending an interrupt to an operating system to cause the operating system to copy the thread tracking information from the work area to a buffer using the set of hardware registers;

retrieving, by the trace application, symbolic data for the thread, wherein retrieving symbolic data for the thread includes retrieving symbolic data from an indexed symbolic database by searching the indexed symbolic database for symbolic data based on a process identifier for the thread; and generating a call sequence of the computer program based on the symbolic data for the thread.

2. The method of claim 1, wherein the set of hardware registers includes a work area register.

3. The method of claim 2, wherein the work area register includes a pointer pointing to a beginning of the work area for the thread.

4. The method of claim 1, wherein the work area length register includes one of a size of the work area for the thread or a pointer pointing to an end of the work area for the thread.

5. The method of claim 1, wherein the thread tracking information for the thread includes a plurality of call stack entries for the thread.

6. The method of claim 5, wherein each of the plurality of call stack entries is written upon detection of one of a method call and a method return for the thread.

7. The method of claim 6, wherein each of the plurality of call stack entries includes an address to and an address from which one of the method call and a method return is executed.

8. The method of claim 7, wherein each of the plurality of call stack entries further includes additional information, and wherein the additional information includes time stamps and performance monitoring counter values.

9. The method of claim 8, wherein the additional information is compressed with the address to and the address from which one of the method call and a method return is executed when each of the plurality of call stack entries is written.

10. The method of claim 8, wherein the additional information is compressed with the address to and the address from which one of the method call and a method return is executed when the thread tracking information is copied from the work area to a buffer.

11. The method of claim 1, wherein the buffer is one of a trace buffer and a consolidated buffer accessible by an application.

12. The method of claim 1, wherein the symbolic data matches the process identifier for the thread and the address of one of a method call and a method return for the thread.

13. The method of claim 1, wherein retrieving symbolic data for the thread includes retrieving symbolic data from one of a directory of the loaded module, a shadow directory, or a loaded module if an address of the loaded module on a disk is known.

14. The method of claim 1, wherein generating a call sequence of the computer program includes associating the retrieved symbolic data with the thread tracking information in the buffer.

15. A data processing system for autonomically determining execution flow of a computer program, the data processing system comprising:
setting means for setting a thread tracking control bit in a processor of the data processing system to enable thread tracking by the processor;
providing means for providing a set of hardware registers for identifying a work area for a thread of the computer program, wherein the work area stores thread tracking information for the thread, and wherein the set of hardware registers includes a current pointer register and a work area length register, and wherein the current pointer register includes a pointer pointing to a location of the work area where last thread tracking information is written;
the processor detecting a particular type of operation responsive to setting the control bit;
responsive to detecting, and before executing, the particular type of operation: a trace application determining whether an overflow is about to occur in the work area using the current pointer register, the work area length register, and a total amount of data in the operation;
responsive to the trace application determining that an overflow is about to occur in the work area, sending means for sending an interrupt to an operating system to cause the operating system to copy the thread tracking information from the work area to a buffer using the set of hardware registers;
the trace application retrieving symbolic data for the thread, wherein the retrieving means comprises searching means for searching an indexed symbolic database for symbolic data based on a process identifier for the thread; and
generating means for generating a call sequence of the computer program based on the symbolic data for the thread.

16. The data processing system of claim 15, wherein the generating means comprises:
associating means for associating the retrieved symbolic data with the thread tracking information in the buffer.

17. A computer program product, including a computer recordable-type non-transitory medium storing computer readable program code for determining execution flaw of a computer program, the computer program product comprising:
first instructions far setting a thread tracking control bit in a processor of the data processing system to enable thread tracking by the processor;
second instructions for providing a set of hardware registers for identifying a work area for a thread of the computer program, wherein the work area stores thread tracking information for the thread, and wherein the set of hardware registers includes a current pointer register and a work area length register, and wherein the current pointer register includes a pointer pointing to a location of the work area where last thread tracking information is written;
third instructions for detecting, by the processor, a particular type of operation responsive to setting the control bit;
responsive to detecting, and before executing, the particular type of operation: fourth instructions for detecting, by a trace application, whether an overflow is about to occur in the work area using the current painter register, the work area length register, and a total amount of data in the operation;
fifth instructions, responsive to the trace application determining that an overflow is about to occur in the work area, for sending an interrupt to an operating system to cause the operating system to copy the thread tracking information from the work area to a buffer using the act of hardware registers;
sixth instructions for retrieving, by the trace application, symbolic data for the thread, wherein the fourth instructions comprises sub instruction for searching an indexed symbolic database for symbolic data based on a process identifier for the thread; and
seventh instructions for generating a call sequence of the computer program based on the symbolic data for the thread.

18. The computer program product of claim 17, wherein the seventh instruction comprises:
sub-instructions for associating the retrieved symbolic data with the thread tracking information in the buffer.

* * * * *